United States Patent [19]

Haberl

[11] Patent Number: 4,672,220

[45] Date of Patent: Jun. 9, 1987

[54] METHOD AND APPARATUS FOR READING OUT AN OPTO-ELECTRIC DETECTOR

[75] Inventor: Fritz Haberl, Munich, Fed. Rep. of Germany

[73] Assignee: Messerschmitt-Bolkow-Blohm GmbH, Munich, Fed. Rep. of Germany

[21] Appl. No.: 770,800

[22] Filed: Aug. 29, 1985

[30] Foreign Application Priority Data

Sep. 4, 1984 [DE] Fed. Rep. of Germany ....... 3432469

[51] Int. Cl.[4] ............................................. G01D 5/26
[52] U.S. Cl. .................................. 250/578; 250/208; 364/736
[58] Field of Search ....................... 250/578, 208, 209; 358/37, 160, 166; 364/736, 724

[56] References Cited

U.S. PATENT DOCUMENTS

| | | | |
|---|---|---|---|
| 4,301,471 | 11/1981 | Holscher et al. | 250/578 |
| 4,373,191 | 2/1983 | Fette et al. | 364/724 |
| 4,566,788 | 1/1986 | Buczek | 250/208 |

Primary Examiner—Edward P. Westin
Assistant Examiner—Charles Wieland
Attorney, Agent, or Firm—Kenyon & Kenyon

[57] ABSTRACT

For reading-out an opto-electric detector constructed as an array of rows, the signal contents of several detector elements of a row section of a row located within a "window" are added up. The "window" is advanced in steps by the provision that the signal content of the last detector element located in the "window" is subtracted from the respective sum signal of all detector elements located in the "window" and the signal content of the detector element located in front of the "window" is added to the sum signal.

8 Claims, 7 Drawing Figures

METHOD AND APPARATUS FOR READING OUT AN OPTO-ELECTRIC DETECTOR

BACKGROUND OF THE INVENTION

The present invention relates to a method and apparatus for reading out an opto-electric detector having at least one row of detector elements, with electronic read-out circuitry, by means of which the detector elements are read out successively by rows, the signal contents of at least a part of the detector elements being stored.

For finding optically faint objects by means of so-called detector arrays, for instance, CCD's or CIDs, it is known to read out the charges of the individual detector elements in more or less short time intervals repeatedly and to add up the respective charges for each detector element, generated by the photo effect. This kind of multiple read-out, however, cannot be used if the object moves relatively to the detector surface. Depending on the magnitude of the velocity, a point-shaped object is then imaged during the exposure time on several detector elements, which leads to a well-known blurring effect; as viewed with respect to intensity, the charge of the photo current is distributed by a motion in the direction of motion over several detector elements, and the charge of the individual element is reduced accordingly.

SUMMARY OF THE INVENTION

It is an object of the present invention to provide a method and apparatus for reading out an opto-electric detector of the above-mentioned type, by means of which the detection of optically faint objects, especially moving objects, is made possible.

The above and other objects of the present invention are achieved by a method for reading-out an opto-electric detector having at least one row of detector elements, with an electronic read-out circuit, by means of which the detector elements are read-out successively row-by-row and wherein the signal contents of at least part of the detector elements are stored, comprising the steps of:

(a) storing continuously the signal contents of a predeterminable number w of detector elements ($y_j$, $x_{i-w}$ to $x_i$) which form a row section of predetermined length of a row of said detector elements, and summing said signal contents to form a continuous charge sum signal $Q_i$;

(b) storing the sum signal $Q_i$ for a time interval; and (c) for the purpose of successive reading-out and forming a following sum signal $Q_{i+1}$, adding to the sum signal $Q_i$, the signal content $q_{i+1}$ of the detector element ($y_j$, $x_{i+1}$) and subtracting the signal content $q_{i-w}$ of the respective last detector element ($y_j$, $x_{(i-w)} \gtrsim 0$) of the row section (i=1 to n, j=1 to m, where w, i, j, n, m are integral numbers).

The above and other objects are also achieved by apparatus according to the invention.

The invention starts from the fact that the sensitivity of an opto-electric detector, i.e., the differentiability of a useful signal from the noise signal, can be increased if the signal contents of several adjacent detector elements illuminated by an object are added up. If, for instance, the charge generated in a detector element of a CCD is considered as the signal content, the total charge due to the photo effect increases linearly in the addition over n detector elements, but the total charge due to the noise increases only as $\sqrt{n}$. The invention is based on the provision that the signal contents of several detector elements located within a window are added up while the window is moved over a detector row in steps. Optimal sensitivity is obtained if only those adjacent detector elements are utilized for the addition which are covered for the duration of the exposure (=reciprocal value of the read-out rate) by the object to be detected, i.e., if the width of the window corresponds to the size of the image of the object during the exposure time. If the width of the window is larger, more noise signals are added in without an increase of the useful signal; if the window is smaller than the imaged object width, signals useful for the addition are lost.

It is therefore important that the above-mentioned window width can readily be varied for optimizing the read-out method according to the invention. This is advantageously accomplished by the use of a FIFO memory described in detail in the following. Since furthermore the signal resulting for a given position of a detector element is obtained from the sum of the signals which are located within the given window (row section), this adding operation would have to proceed each time anew as the window is moved along. The method according to the invention simplifies this advancing of the window, i.e., the reading-out of the detector, by the provision that the respective new sum signal starts out from the preceding sum signal, to which is added only the signal content of the detector element which is ahead, as viewed in the scanning direction, of the originally considered window, and the signal content of the last detector element within the window is subtracted therefrom. If, for instance, the window comprises a row section of eight detector elements and if the read-out rate for the individual detector elements is, for instance, 1 MHz, a computing speed of 8 MHz (period 125 ns) would be required for a respectively renewed sum formation; since the computing effort per sampling step is limited in the method according to the invention to only two operations, a computing rate of 2 MHz (period 0.5 usec) is required. The above-mentioned FIFO memory is particularly well suited also for carrying out this operation, which will be explained in greater detail in the following, making reference to the embodiments illustrated.

BRIEF DESCRIPTION OF THE DRAWINGS

The invention will be described in greater detail in the following detailed description, with reference to the drawing figures, in which.

DETAILED DESCRIPTION

Figure 1:
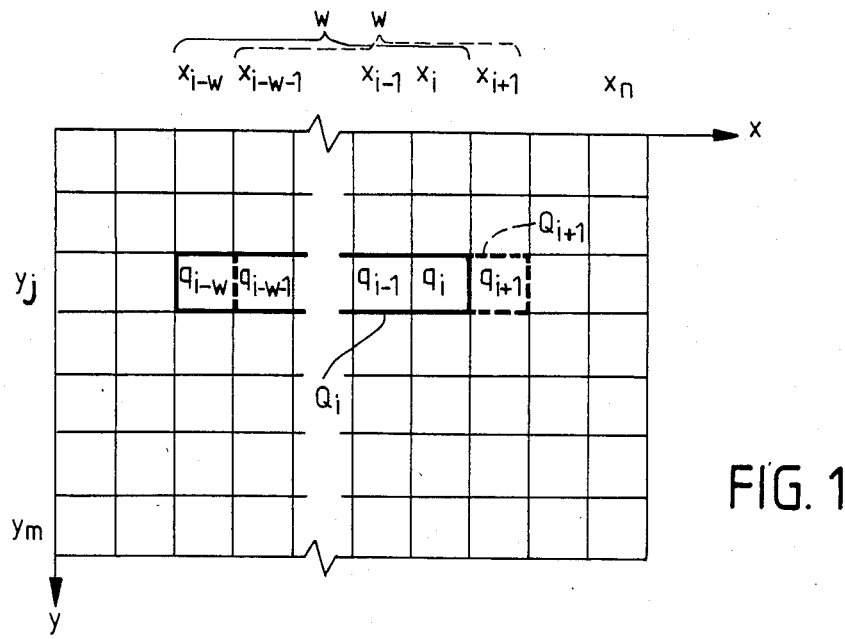
FIG. 1 is a schematic design of an opto-electric detector with detector elements arranged in m rows and n columns.

FIG. 1 shows schematically the arrangement of the light-sensitive part of an opto-electric detector, for instance, a CCD (Charge-Coupled Device), in which the individual detector elements are arranged in m rows and n columns. The number of detector elements per row and column is typically 256. The charge $q_i$ of a detector element with the coordinates $x_i$ and $y_j$ generated by the photo effect but also by noise is interrogated row by row successively in a manner known in CCD technology, is amplified and converted into a digital signal.

Figure 2A:
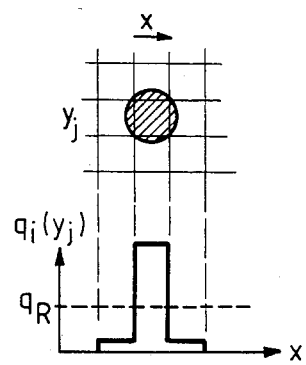
FIGS. 2a and 2b show two examples of the signal waveform along a detector row of a light-emitting stationary object and a moving object, respectively, if the detector elements are evaluated individually.
Figure 2B:
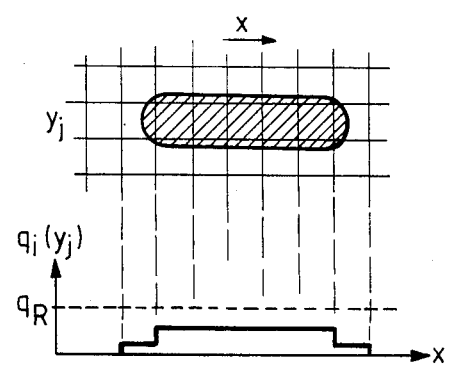

For the case that, for instance, the position of an optically faint star is to be determined with such a detector disposed in a satellite, it is important whether the star imaged on a detector element during the exposure time thereof has shifted. This is the case, for instance, if the exposure is very long or if the satellite together with the detector rotates about a spin axis. In FIG. 2a, the signal waveshape is shown for the individual read-out of the detector elements in row $y_i$ if the star or the light spot imaged on the detector does not move. The read-out cycle, i.e., the exposure time per detector element, is chosen so that the charge $q_i$ of the detector element fully struck by the light spot is distinctly above the charge $q_R$ caused by noise.

The read-out process itself will be explained in greater detail with the aid of FIG. 1. A sum signal $Q_i$ is assigned to every detector element with the coordinates $y_j$ and $x_i$, which is composed of the sum of the charges $q_{i-w}$ to $q_i$ to the detector elements with the coordinates $y_j$ and $x_{i-w}$ to $x_i$. The sum signal $Q_i$ thus contains the signal contents of w adjacent detector elements, i.e., of a row section with the width w-times the size of a detector element. The sum signal $Q_i$ is interim-stored, for one, for the further read-out process, and secondly, is passed on as the read-out signal for further signal processing, for instance, for determining the image center of the source of radiation, to electronic circuitry not part of the present invention.

Figure 3:
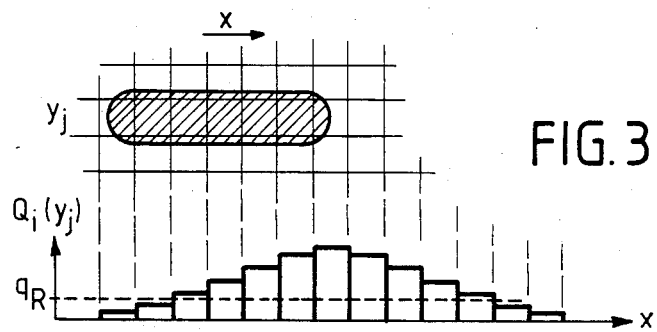
FIG. 3 shows the signal waveform of an object which is moving during the exposure time, if the detector elements are read out by the method according to the invention.

The next scanning step, i.e., the formation of the next-following sum signal $Q_{i+1}$ for the detector element with the coordinates $y_i$ and $x_{i+1}$ is accomplished by the provision that the signal content $q_{i-w}$ of the detector element located at the left edge of the previously picked-up row section with the coordinates $y_j$ and $x_{i-w}$ is subtracted from the stored sum signal $Q_i$, and furthermore the signal content $q_{i+1}$ of the detector element located ahead of the right edge of the row section with the coordinates $y_j$ and $x_{i+1}$ is added. The row section with the sum signal $Q_{i+1}$ is thus shifted relative to the row section with the sum signal $Q_i$ to the right by the spacing of one detector element and again contains the same number w of detector elements. The new sum signal $Q_{i+1}$ is again interim-stored instead of the preceding sum signal $Q_i$ or passed-on for further processing, where the interim-stored value is available for the next scanning step, i.e, for forming the next sum signal $Q_{i+2}$, etc. In this manner the detector is read-out successively row-by-row. FIG. 3 shows the signal obtained for a moving object using the method of the present invention. As shown, the signal generated comprises a series of steps.

Figure 4:
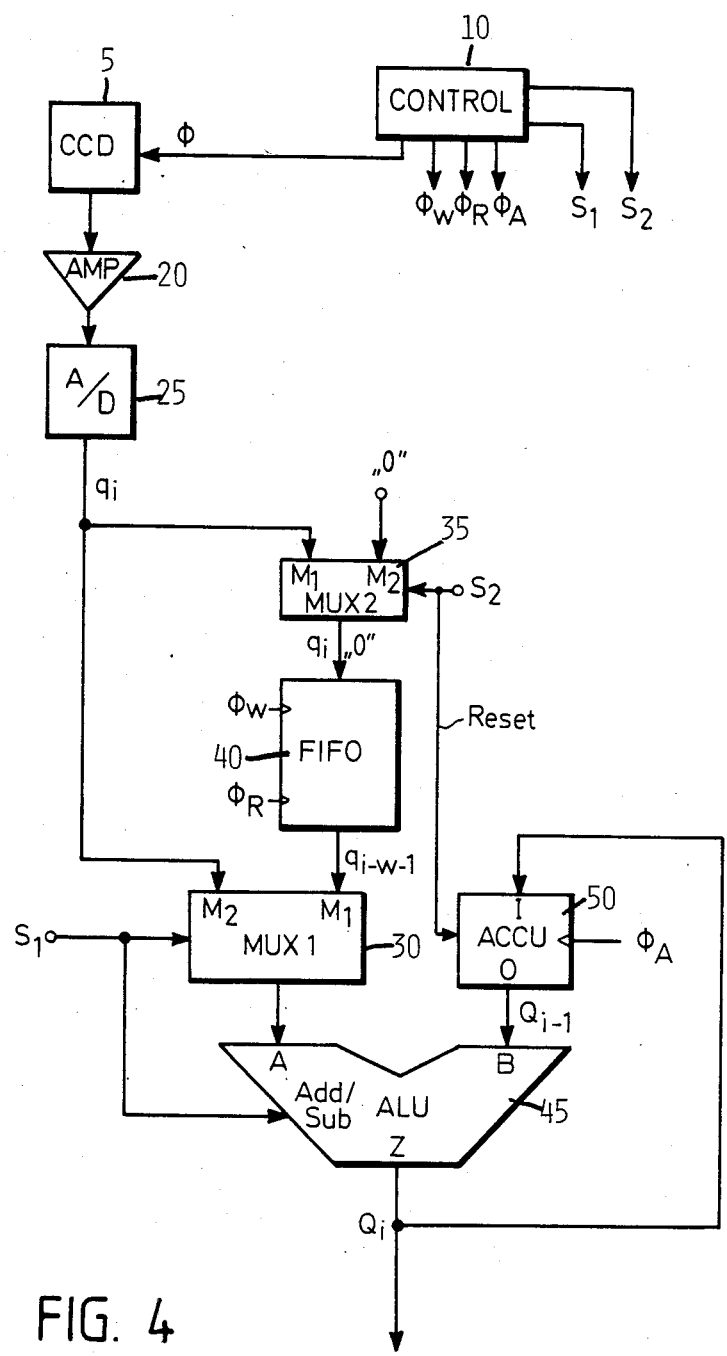
FIG. 4 is a block diagram of a device for carrying out the method according to the invention, using multiplexers.

In FIG. 4 a block diagram for an electronic circuit is shown, by which the above-described read-out method can be carried out. The signals furnished by a detector designed in accordance with FIG. 1, for instance, a CCD 5, are fed in the rhythm of an electronic control circuit CONTROL 10, known per se, to a preamplifier AMP 20 and are digitized in an analog/digital converter A/D 25. These components are known from the picture recording technique based on CCDs and are substantially contained, for instance, in the CCD camera type XC 37 available from Sony. At the output of the analog/digital converter A/D 25 are then serially present the digitized signal contents $q_i$ of the detector elements. The signal $q_i$ is fed, for one, to the input $M_2$ of a multiplexer 30 (MUX 1) and secondly, via the input $M_I$ of a further multiplexer 35 (MUX 2), to the input of a first-in first-out (FIFO) memory 40. At the input $M_2$ of the multiplexer MUX 2, the fixed value "O" is present. A suitable multiplexer is, for instance, type SN 54153, and a suitable FIFO memory, is, for instance, type AM 2841 available from Advanced Micro Devices which is described in "MOS/LSI Data Book", 1980, pages 6–7 to 6–11. The output of the FIFO memory 40 is connected to a further input $M_1$ of multiplexer MUX 1. The output of multiplexer MUX 1 is connected to an input A of an adding or subtracting stage ALU 45 (=Arithmetic Logic Unit, called Arithmetic Unit in the following), for instance, of the type SN 54181. The second input B of the Arithmetic Unit ALU 45 is connected to the output O of an interim memory ACCU 50, for instance, of the type SN 54194. The input I of the interim memory ACCU 50 is connected to the output Z of the Arithmetic Unit ALU 45.

Figure 5:
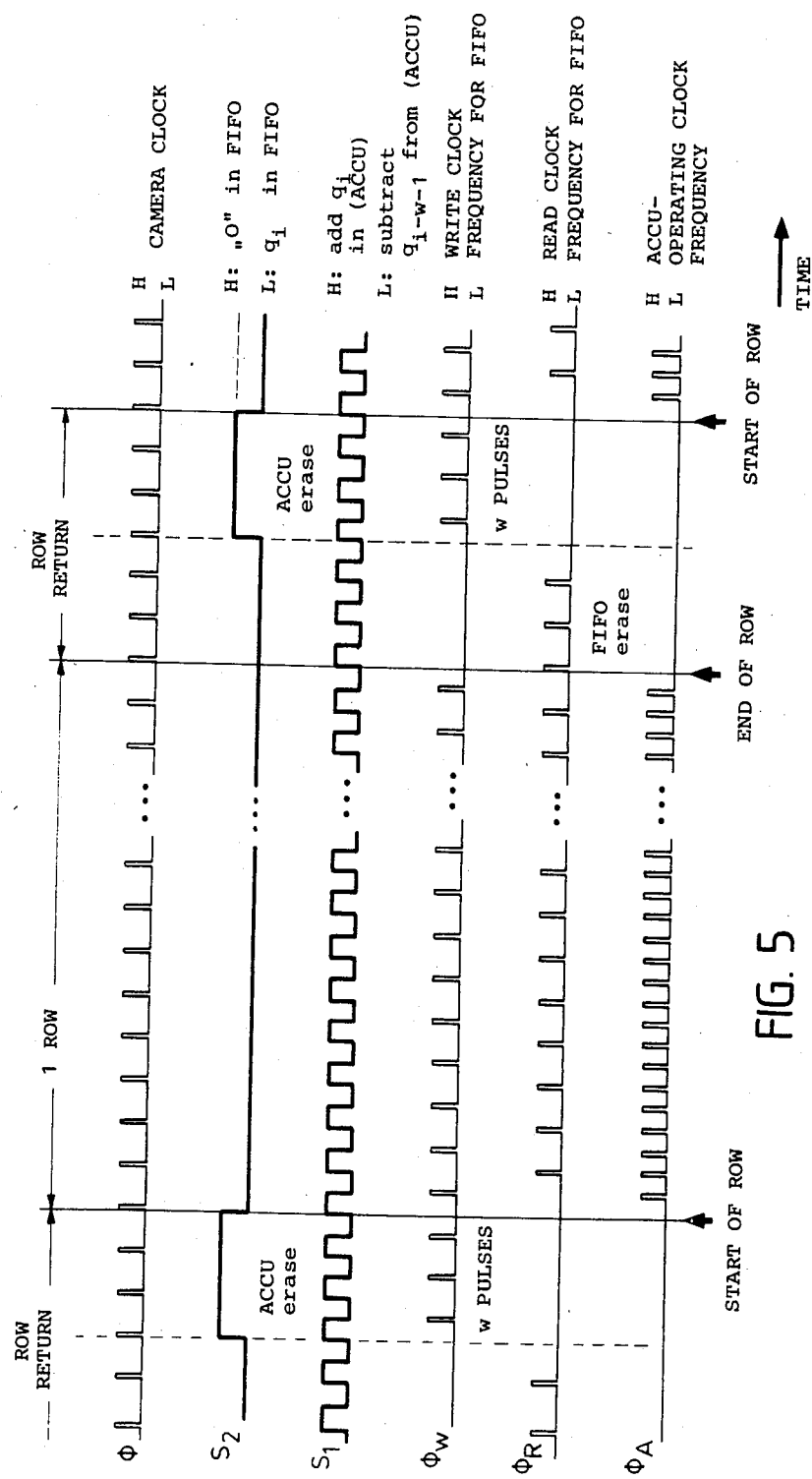
FIG. 5 is a timing diagram for the apparatus of FIG. 4.

The above-described components MUX 1, MUX 2, FIFO, ALU and ACCU have clock and control inputs respectively, which are connected to the electronic control circuit CONTROL 10, where the sequence of these clock and control signals is shown in the timing diagram of FIG. 5 as well as from the followintg description of the operation of the apparatus.

Before the start of the interrogation of each row $y_j$, the content of the interim memory ACCU 50 is erased in the row return (FIG. 5) by means of the control signal $S_2$ used as the reset signal. Likewise in the row return, the multiplexer MUX 2 is addressed so that, via a writing clock, $\phi_w$, the fixed value "O" is written-in for the duration $S_2 = H$ into the FIFO memory as often as the length of the row section to be considered in the future is to be, i.e., the number w of the detector elements utilized for a sum signal. With the start of a row, the read-out of the detector elements x of a row $y_j$ takes place, with the camera clock frequency $\phi$. The processing of each detector element $x_i$ of this row requires two clocks: with the first clock, the signal content $q_i$ is written into the FIFO memory 40 with a write clock $\phi w$ and simultaneously, via the multiplexer MUX 1, is added in the Arithmetic Unit ALU to the prevailing content of the interim memory ACCU, which is clocked by a clock $\phi_A$. By a second clock, the value stored first in the FIFO memory 40 is selected by means of a read clock $\phi_R$ and, via the multiplexer MUX 1 addressed accordingly by the signal S1, is subtracted from the content of the memory ACCU 50, addressed simultaneously by the signal $\phi_A$, in the Arithmetic Unit ALU 45. The result is present at the output Z of the Arithmetic Unit ALU, from where it is again transferred into the interim memory ACCU 50 by means of the signal $\phi_A$ and corresponds to the respective sum signal $Q_i$.

As may readily be seen, the signal contents of the first w detector elements are merely added up at the start of every row, since the first few signals which are stored in the FIFO are subtracted during the formation of a sum signal $Q_i$ from a previously stored sum signal $Q_{i-1}$, and thereby the complete window (row section with w detector elements) is advanced by one step.

Figure 6:
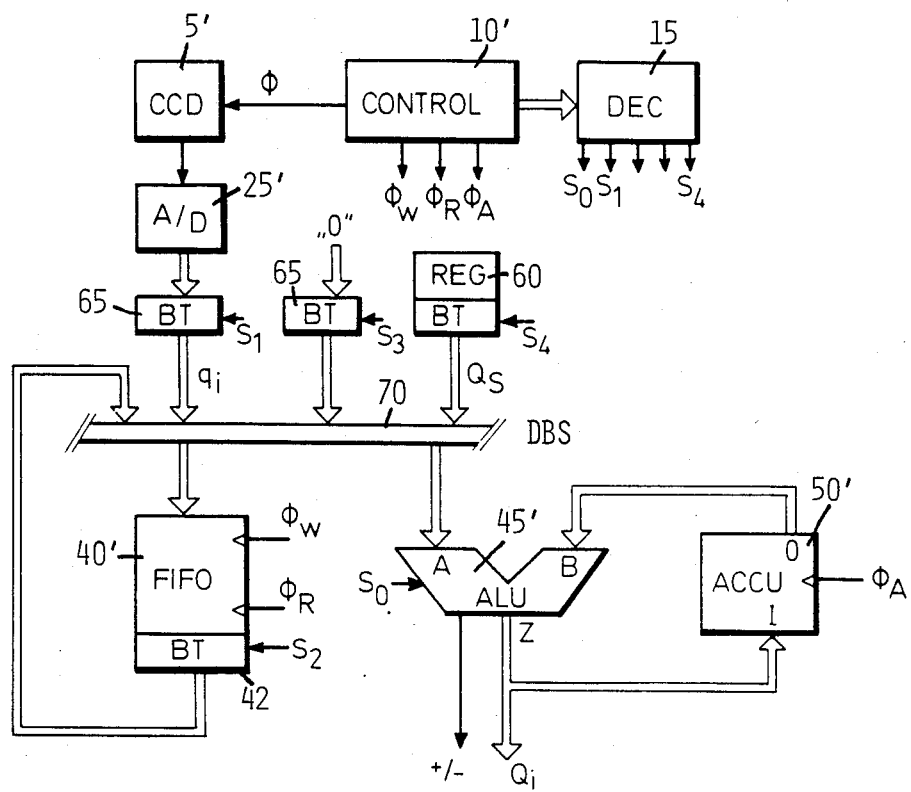
FIG. 6 is a block diagram of alternative apparatus for carrying out the method according to the invention, using a data base system.

FIG. 6 shows a modification of the circuit according to FIG. 4, in which a data bus system is used instead of the multiplexers. In addition, a register REG 60 is provided, in which a threshold value $Q_S$ is stored. The signal contents $q_i$ of the detector elements as well as the fixed value "O" are fed via bus driver stages BT 65 with so-called three-state outputs, for instance, of the type SN 54368, to data bus DBS 70 connected to the input A of the Arithmetic Unit ALU 45'. Likewise, the input and output of the FIFO memory 40' as well as of the register REG, 60 which is, for instance, of the type SN 54194, are connected to the data bus 70 via a three-state driver BT 42. The three-state outputs of the components BT, REG and FIFO are addressed via an electronic control circuit CONTROL 10' and, via a decoder DEC 15, for instance, of the type SN 54138, in the sequence described above. At the start of the read-out process of a new row $y_j$, the interim memory ACCU 50' is erased again. Then, the value $Q_S$ stored in the register REG is subtracted in an intermediate cycle from the content of the interim memory ACCU 50' and the result is again entered into the intermediate memory ACCU 50'; in the interim memory ACCU 50' there is now a negative value of the magnitude of the predetermined threshold value $Q_S$. Thereupon, the fixed value "O" is written into the FIFO memory 40' in the quantity w provided, analogously to the process described in FIG. 4. Also the serially present signal contents $q_i$ of the detector elements are added up in the same manner as was described with reference to FIG. 4. Since, however, a negative value was set into the interim memory ACCU 50', also the output signal of the Arithmetic Unit ALU 45' is negative as long as the current sum signal $Q_i$ does not exceed the threshold value $Q_s$. This is manifested by the fact that the sign bit provided by the Arithmetic Unit ALU 45' of the type SN 54181 indicates a negative value. For further processing, only such sum signals $Q_i$ are utilized which have a positive sign. Since however, the sum signals $Q_i$ present at the output of the Arithmetic Unit ALU 45' are reduced by the threshold value $Q_s$, it is advisable for further processing to add the threshold value $Q_s$ back again. This can be accomplished with the existing circuit also if the threshold value $Q_S$ and the content of interim memory ACCU 50' are added without clocking the interim memory. Furthermore, in order to provide the threshold value $Q_s$ in the circuit of FIG. 4, the output of a threshold register can be coupled to a third input of multiplexer MUX 1.

In the foregoing specification, the invention has been described with reference to specific exemplary embodiments thereof. It will, however, be evident that various modifications and changes may be made thereunto without departing from the broader spirit and scope of the invention as set forth in the appended claims. The specification and drawings are, accordingly, to be regarded in an illustrative rather than in a restrictive sense.

What is claimed is:

1. A method for reading-out an opto-electric detector having at least one row of detector elements, with an electronic read-out circuit, by means of which the detector elements are read-out successively row-by-row and wherein the signal contents of at least part of the detector elements are stored, comprising the steps of:
   (a) storing continuously the signal contents of a predeterminable number w of detector elements ($y_j$, $x_{i-w}$ to $x_i$) which form a row section of predetermined length of a row of said detector elements, and summing said signal contents to form a continuous charge sum signal $Q_i$;
   (b) storing the sum signal $Q_i$ for a time interval; and
   (c) for the purpose of successive reading-out and forming a following sum signal $Q_{i+1}$, adding to the sum signal $Q_i$, the signal content $q_{i+1}$ of the detector element ($y_j$, $x_{i-1}$) placed in front of the respective first detector element ($y_j$, $x_i$) of the row section and subtracting the signal content $q_{i-w}$ of the respective last detector element ($y_j$, $x_{(i-w)} \geq 0$) of the row section (i=1 to n, j=1 to m, where w, i, j, n, m are integral numbers).

2. The method recited in claim 1, wherein the charge sum signal $Q_i$ is compared with a predetermined threshold value $Q_S$.

3. The method recited in claim 2, wherein the threshold value $Q_S$ is stored as a negative or positive signal and is added to or subtracted from the signal content $q_{i=1}$ of the first detector element ($y_j$, $x_{i=1}$) of a row for forming a first sum signal $Q_{i=1}$.

4. Apparatus for reading-out an opto-electric detector having at least one row of detector elements, and having electronic read-out circuitry connected to the detector, by means of which the detector elements are read-out successively row-by-row and wherein the signal contents of at least part of the detector elements are stored, and for forming a sequence of sum signals of row sections of predetermined length of each row of said detector, comprising arithmetic logic unit means, multiplexer means having an output connected to one input of the arithmetic logic unit means, first-in first-out memory means having an output coupled to a first input of the multiplexer means, interim memory means having an input coupled to an output of the arithmetic logic unit means and having an output coupled to an input of the arithmetic logic unit means, the prevailing digitized signal content $q_i$ of the detector elements ($y_j$, $x_i$) being provided at a second input of the multiplexer means and at an input of the first-in first-out memory means, said sequence of sum signals being provided at an output of said arithmetic logic unit means.

5. The apparatus recited in claim 4, further comprising threshold register means coupled to a third input of the multiplexer means.

6. Apparatus for reading-out an opto-electric detector having at least one row of detector elements, and having electronic read-out circuitry connected to the detector, by means of which the detector elements are read-out successively row-by-row and wherein the signal contents of at least part of the detector elements are stored, and for forming a sequence of sum signals of row sections of predetermined length of each row of said detector, comprising arithmetic logic unit means, first-in first-out memory means, threshold register means, means for supplying a fixed value signal, means for supplying the digitized signal content $q_i$ of the detector elements and data bus means coupling said aforementioned means together, said first-in first-out memory means being fed by said data bus means, and further comprising interim memory means having an input coupled to an output of the arithmetic logic unit means and an output coupled to an input of the arithmetic logic unit means, said sequence of sum signals being provided at said output of said arithmetic logic unit means.

7. The apparatus recited in claim 6, further comprising threshold register means coupled to the databus means.

8. The apparatus recited in claim 6, further comprising three-state output means coupling said first-in first-out memory means, threshold register means, means for supplying a fixed value and means for supplying the digitized signal content of the detector elements to said data bus means.

* * * * *